United States Patent
Ambraschka et al.

[15] 3,635,135
[45] Jan. 18, 1972

[54] LIGHT-MEASURING MEANS FOR MICROFILM CAMERA

[72] Inventors: Kasimir Ambraschka, Unterhaching; Horst Bickl, Munich, both of Germany

[73] Assignee: Agfa-Gevaert AG, Munich, Germany

[22] Filed: Feb. 18, 1970

[21] Appl. No.: 12,332

[30] Foreign Application Priority Data

Mar. 24, 1969 Germany ..................P 19 14 944.1

[52] U.S. Cl..............................95/10 A, 240/1 EL, 356/202
[51] Int. Cl. .............................................................G01j 1/02
[58] Field of Search....................356/203, 202, 209; 95/10 A; 240/1 EI; 350/96 R

[56] References Cited

UNITED STATES PATENTS 1,864,442   6/1932   Kinsey .....................................95/10 A
3,068,697   12/1962   Carlson....................................350/96

FOREIGN PATENTS OR APPLICATIONS 523,105   4/1955   Italy ........................................356/209

*Primary Examiner*—Samuel S. Matthews
*Assistant Examiner*—Russell E. Adams, Jr.
*Attorney*—Arthur O. Klein

[57] ABSTRACT

A light-measuring device for microfilm cameras which is adapted to measure in a point-by-point manner the brightness of an object plane. A small area of an object plane is projected by means of suitable light source via a measuring objective lens onto a measuring photoelectric cell. Light-conducting means are optically aligned with the objective lens and the light source. The photoelectric cell is mounted in the light-conducting means and has an end surface which is coplanar with an end surface of the light-conducting means. The measuring objective lens serves to also project a pattern of light defined by the shape of the end surface of the light-conducting means onto the object plane.

8 Claims, 2 Drawing Figures

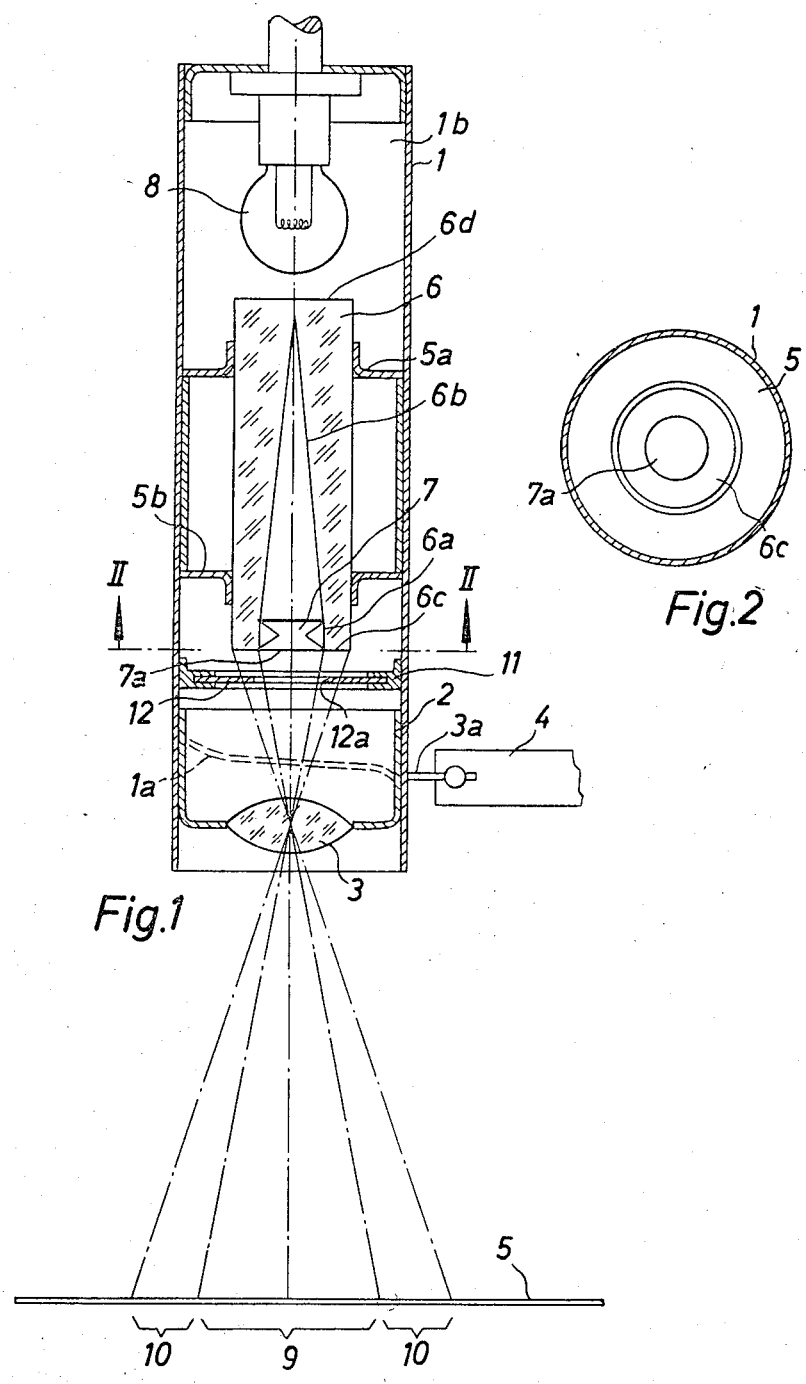

LIGHT-MEASURING MEANS FOR MICROFILM CAMERA

BACKGROUND OF THE INVENTION

The invention relates to a microfilm camera in which the microfilm is advanced in a stepwise manner. The camera arrangement has a surface for supporting the object to be photographed. Furthermore, the camera arrangement is provided with light intensity measuring means which are disposed above the object plane and which are capable of measuring the light reflected by points of the object to be photographed. A small area of the object plane is projected by means of a measuring objective lens onto a measuring photoelectric cell.

This type of measuring arrangement is in general provided with means for indicating the size and position of the measuring field which is projected onto the object plane. The measuring field is, during the measurement, brought into coincidence with a suitable region of the object to be photographed, for example, an area which has no indicia on it, so that the adjustment for the unchanging background density of the photographic negative can be effected. Heretofore the measuring field position was indicated for this purpose by projecting a crosshair into the measuring field or by masks or indicators which can be swung into the object plane. Such a projection arrangement must, however, by removed from the object plane during the actual measuring process at least during the taking of a photograph, in order to avoid extraneous influences on the measuring photoelectric cell.

SUMMARY OF THE INVENTION

According to the improved arrangement of the invention, the measuring objective lens serves also for projecting a measuring field indication being situated in the plane of the measuring photoelectric cell. The measuring field indication may take the form of a light, concentric ring which surrounds the measuring field.

Since, in accordance with the arrangement of the invention, the measuring objective lens also acts as the projecting objective lens for the measuring field indication, the light of the measuring field indication is not reflected back into the measuring field itself under all circumstances without adjustments due to the reflection characteristics of the light beam. This is, for example, also not the case when the light-indicating field surrounds the dark measuring field. The measuring field projection, therefore, needs not to be turned off during the measuring process. Furthermore, the exact coincidence of the projections of the measuring field and the indicating field is maintained even when they are shifted relative to the object plane or are moved over the object plane or are projected obliquely onto the object plane, so that they take the form of conical sections.

An embodiment of the invention, which has been found to be particularly simple in construction and particularly effective, is one in which the measuring photoelectric cell is disposed concentrically in a light-conductor arrangement, which connects the field surrounding the measuring photoelectric cell with a lamp space. For example, the light conductor can be formed as a transparent cylinder, one end surface of which lies in the vicinity of the source for projecting light beams and at the other end surface of which there is inserted a measuring cell which is secured therein. The bore, in which the measuring photoelectric cell is mounted, is extended coaxially into a conical space which is coaxial with respect to the cylinder, so that the possibly largest portion of the light reaching the light conductor is deviated without any excessive light losses from the backside of the measuring cell.

The measuring field indication can in principle be effected with white light from the projection light source. Since however, normally the background surface of the object plane as well as, for example, the white, matted, frosted glass plate on which the object to be photographed is supported is of white color the detectability of the measuring field indication is increased if, in accordance with a further feature of this invention, there is provided a color filter in the path of the light beam.

Lastly, it is possible to adjust the distance between the object plane and the light-measuring apparatus, in particular, for compensating the measuring results which may be influenced by different image scales, by including an automatically compensating focusing arrangement into the device which is operatively connected to measuring objective lens.

BRIEF DESCRIPTION OF THE DRAWING

In the drawing there is illustrated, in accordance with the invention, an example thereof in which:

FIG. 1 is a cross-sectional elevational view of the measuring installation in accordance with the invention forming part of a stepwise microfilm photographic camera; and FIG. 2 is a cross-sectional view along line II—II of FIG. 1.

DESCRIPTION OF PREFERRED EMBODIMENT

According to FIG. 1, the arrangement of the invention is provided with a housing 1 in which there is arranged a slidable tube 2 in which there is mounted a measuring objective lens 3. An adjusting pin 3a projecting into a helical adjusting groove 1a of the housing 1 is connected to an actuating member 4, which forms part of an automatic adjusting arrangement (not illustrated in detail). The actuating member 4 can, for example, be connected to the adjusting arrangement for the objective lens of a camera having an identical focal lens as the measuring objective lens 3, or can be operatively connected to a stationary adjusting cam, which adjusts the measuring objective lens 3 in accordance with the distance between the lens and the object plane 5.

There is arranged in the housing 1 of the measuring arrangement a transparent, plastic cylinder 6 which is supported therein by means of the flanges 5a and 5b. A bore 6a extends coaxially into the cylinder 6. A conventional photoelectric measuring cell 7, known in the art, is mounted in the bore 6a. The bore 6a extends into a conical space 6b which has the form of a pointed cone and which is coaxial with the cylinder 6. The lower end surface of the cylinder 6 coincides with the lower end surface 7a of the photoelectric measuring cell 7. A chamber 1b for accommodating a lamp therein is provided in the housing in the vicinity of the upper limiting surface 6d of the cylinder 6. The lower portion of the chamber 1b is closed by the flange 5a. A projecting light source 8, for example a light bulb, is mounted in the chamber 1b as illustrated in FIG. 1.

The plastic cylindrical body 6 act as a light conductor in the arrangement for conducting the light from the projecting light source 8 through the cylindrical body 6. The largest portion of this light is, as a consequence of total reflection at the outer periphery of the cylindrical body 6 and at the conical surface 6b, reflected by these surfaces until it exits through the lower end surface 6c of the cylinder 6.

As can be noted from FIG. 2, a ring is formed by the surface 6c which surrounds the measuring field 7a when the projecting light source 8 is energized. The latter, according to FIG. 1, lies in the same plane as the surface of the measuring field 7a of the measuring photoelectric cell 7. This ring-shaped contour is, by means of the measuring objective lens 3, projected onto the surface 5 in accordance with the dot-dash lines illustrated in FIG. 1. Due to the reflection characteristics of the projected light beam, there is returned to the measuring photoelectric cell 7 only that light from the surface 9 which corresponds to the measuring photoelectric cell surface 7a. The surface 10, which is illuminated by the projecting light source 8 via the measuring objective lens 3, is exclusively reflected into the area of the illuminated ring 6c. The projection light source 8, consequently, needs not to be turned off during the measuring process, because the light emanating therefrom does not influence the measured results. The measuring light source 8 is only turned off during the taking, respectively, filming of the object to be photographed, preferably automatically when the switch for activating the camera is actuated.

Lastly, there is provided a color filter 12 which is mounted by means of a support member 11 in the housing 1 and which serves to intensify the detectability of the measuring field indicator. For example, this filter may be a red filter. The color filter 12 has an opening 12a through which the light beam corresponding to the measuring light portion of the light beam is passed, in order not to change the measuring light insofar as its spectral composition is concerned.

Although the invention has been illustrated and described with reference to the preferred embodiment thereof, we wish to have it understood that it is in no way limited to the details of such embodiment but is capable of numerous modifications within the scope of the appended claims.

What is claimed is:

1. For use with a microfilm camera, a device for measuring the brightness of a predetermined area of an object plane, comprising in combination, a light source operatively mounted in said device, light-conducting means having a first end surface mounted in alignment with said light source in said device and a second end surface for producing in cooperation with said light source a pattern of light on said object plane indicative of the measuring field size, photoelectric measuring means having a front surface coplanar with said second end surface of said light-conducting means and being mounted within a recess in said light-conducting means, and objective lens means mounted in optical alignment with said light-conducting means and photoelectric measuring means, said light source being adapted to project a beam of light through said light-conducting means, thereby projecting a pattern of light defined by the shape of said second end surface of said light-conducting means via said objective lens means onto said object plane.

2. The device for measuring brightness of a predetermined area of an object plane as set forth in claim 1, wherein said light-conducting means is generally cylindrical and said recess is coaxially arranged within said light-conducting means.

3. The device for measuring the brightness of a predetermined area of an object plane as set forth in claim 2, wherein said second end surface is formed as an annular surface which is concentric with the front surface of said photoelectric measuring means.

4. The device for measuring the brightness of a predetermined area of an object plane as set forth in claim 3, wherein said photoelectric measuring means includes a photoelectric cell having a cylindrical configuration said device further including a chamber in which said light source is disposed.

5. The device for measuring the brightness of a predetermined area of an object plane as set forth in claim 4, wherein said light-conducting means consists of a transparent cylindrical body.

6. The device for measuring the brightness of a predetermined area of an object plane as set forth in claim 5, wherein said recess is formed as a conical bore along the axis of said transparent cylindrical body.

7. The device for measuring the brightness of a predetermined area of an object plane as set forth in claim 1, including light-filter means mounted in said device between said object plane and said light-conducting means.

8. The device for measuring the brightness of a predetermined area of an object plane as set forth in claim 1, wherein said device is movably mounted with respect to said object plane, and including lens focusing means operatively connected to said objective lens means, said lens focusing means being adapted to adjust said objective lens means in accordance with the distance changes between the object plane and the device.

* * * * *